US005550792A

United States Patent [19]
Crandall et al.

[11] Patent Number: 5,550,792
[45] Date of Patent: Aug. 27, 1996

[54] SLICED PHASED ARRAY DOPPLER SONAR SYSTEM

[75] Inventors: F. Anthony Crandall, Salt Lake City; Kevin V. Jorgensen, Draper; Brian L. Grose, Bountiful; Monroe Tyler, Sandy, all of Utah

[73] Assignee: EDO Western Corp., Salt Lake City, Utah

[21] Appl. No.: 316,048

[22] Filed: Sep. 30, 1994

[51] Int. Cl.$^6$ ................................................. H04R 17/00
[52] U.S. Cl. ........................... 367/155; 310/337; 367/135; 367/168
[58] Field of Search ..................... 310/334, 337; 367/153–157, 165, 168, 173

[56] References Cited

U.S. PATENT DOCUMENTS

| | | | |
|---|---|---|---|
| 4,305,014 | 12/1981 | Borburgh et al. | 310/334 |
| 4,371,805 | 2/1983 | Diepers et al. | 310/334 |
| 4,641,291 | 2/1987 | Simmons, Sr. et al. | 367/157 |
| 4,890,268 | 12/1989 | Smith et al. | 367/155 |
| 5,099,459 | 3/1992 | Smith et al. | 367/153 |
| 5,267,221 | 11/1993 | Miller et al. | 367/155 |
| 5,329,498 | 7/1994 | Greenstein | 367/155 |

*Primary Examiner*—Harold J. Tudor
*Attorney, Agent, or Firm*—Thorpe, North & Western

[57] ABSTRACT

A method and apparatus is disclosed for making a sliced phased array transducer formed from a single piezoelectric disk which has been bonded to a metal coated support surface. After bonding, the disk and attached metallic coating are cut into a plurality of conductively isolated staves which are then wired into a sequence which allows the array to emit two beams in opposite directions at a depression angle of about 60 degrees. In use, two of the arrays are used adjacent to each other with one emitting beams along the port and starboard sides of the vessel and the other being rotated 90 degrees to emit beams to the force and aft of the vessel, the four beams thereby forming a Janus configuration. Alternatively, the beams could be rotated 45 so that two beams are directed to both the port and starboard sides.

9 Claims, 11 Drawing Sheets

SLICED PHASED ARRAY DOPPLER SONAR SYSTEM

BACKGROUND present invention relates to sonar systems, and more particularly relates to a sonar transducer adapted to provide velocity measurements of a vessel moving in a body of water, or any motion of the water relative to the transducer.

Both surface and underwater vessels must have an accurate indication of their velocity and their position in the water to perform their intended missions. In some cases, position can be determined using radio and satellite navigational references. In other situations, such navigational references are not available or unusable. Thus, the vessel needs a navigation mechanism which does not rely on such surface based devices to determine its position and velocity. This need becomes more significant as the complexity or duration of the vessel's activities increase.

Likewise, accurate charting of currents is essential for safe navigation. A sonar transducer capable of tracking motion of water relative to the transducer will enable detailed profiling of water currents. Even more desirable is a sonar that could simultaneously track vessel motion through the water relative to the ocean floor, as well as track the water currents relative to the motion of the vessel.

In the past, vessel mounted sonar systems have existed in which the ocean bottom is used to reflect acoustic energy back to the ship. By measuring the Doppler shift such previously available systems attempted to accurately determine the vessel's speed over the bottom of the body of water. Such previously available schemes, sometimes called Doppler Speed Logs or Doppler velocity logs, have been utilized for navigation in docking of large ships for some time. Their objective is to measure a ships velocity with respect to the floor of the body of water and without reference to any land-based objects and without being influenced by wind and other adverse weather conditions.

In general, previously available Doppler Speed Log sonar systems have included sonar transducers to send and receive the acoustic energy. These transducers are hull mounted similar to echo sounder transducers. Preamplifiers are generally needed in the vicinity of the receiving transducer to amplify the weak return signal. Electronic circuitry is required to process the returned signal so that the frequency shift can be determined and a velocity may be computed. A method of display is also required to convert the electrical signal to a visual indication that can be used by the ship's crew.

In order for the motion of a ship to cause a frequency shift in a sonar transmission, the sonar beam must have a directional vector aligned with the motion of the ship. Disadvantageously, with many of the previously available devices relatively small trim changes of the ship can cause large apparent velocity changes. To eliminate this sensitivity to trim, an arrangement referred to as the Janus configuration is used. According to this configuration, beams are generated in the plus and minus thirty degree directions relative to a vertical primary axis. The beams extend fore and aft relative to the longitudinal axis of the ship.

Previously available Doppler Speed Log sonar systems have typically been of the pulse type since continuous wave systems cease to operate when the depth exceeds a predetermined amount, for example, 200 feet. This is because as the water becomes deeper, the number of scattering particles, such as air bubbles, increases the scattered signal begins to dominate over the signal reflected from the bottom.

In one previously available pulse Doppler Speed Log sonar system, commercially manufactured by the Marquardt Company, a two-axis transducer is utilized. This transducer has two separate sending and receiving faces, each aligned at an angle relative to the primary axis for generating the beams in the plus and minus thirty degree directions. The transducer is mounted in a housing on the bottom of the ship which creates a cavity where flow is disturbed and air bubbles can collect and seriously degrade the accuracy of the system.

Another previously available Doppler Speed Log sonar system referred to as Atlas-Dolog 10 has been commercially available from Krupp GMBH of Bremen, Germany. In that system, separate transmitter and receiver transducers are utilized. Each consists of a large number (72) of lead-zircontitanate crystals. Each of the crystals has a flat, cylindrical shape. The crystals are embedded in a block of synthetic material. Complex electronic circuitry including drivers and phase shifters is utilized to generate the sonar beams.

A more recent prior art Doppler Speed Log incorporates a phased array Doppler sonar transducer. See U.S. Pat. No. 4,641,291 which is hereby incorporated by reference. The phased array includes a plurality of piezoelectric rectangular planar staves held in side-by-side relation in a laminate assembly by insulative spacers. The polarity of adjacent pairs of the staves is inverted relative to each other. This polarity is achieved by placing staves with positive sides "up" or "down". The acoustic centers of the staves are spaced apart a distance of approximately one-half wavelength of the operation frequency. The array of staves defines an active planar acoustic face for sending a pair of sonar beams which are angularly separated by about 60 degrees without electronically phasing or time delaying the signals transmitted to the individual staves and without mechanically rotating the array. The individual receive signals are obtained by a simple phase delay circuitry.

While the phased array Doppler sonar transducer described above is an advance over the previous state of the art, its fabrication is very labor intensive. Each stave must be properly oriented and must be individually placed in the array. Additionally, the staves must be placed precisely so that the acoustic centers of the staves are spaced apart one-half wavelength of the operating frequency. Furthermore, each stave has to be hand wired so that it will transmit and receive properly.

Thus, it would be an advance in the art to provide a transducer for use in a phased array Doppler sonar system whose fabrication is not labor intensive and which assures that the acoustic transducer components will be properly and precisely placed.

OBJECTS AND BRIEF SUMMARY OF THE INVENTION

Accordingly, it is the primary object of the present invention to provide an improved phased array Doppler sonar transducer.

It is another object of the present invention to provide a Doppler sonar phased array transducer with a consistent center to center spacing across the array.

It is yet another object of the invention to improve dimensional control of a phased array acoustic transducer and to reduce the size of the phased array acoustic transducer.

It is an additional object of the present invention to provide a more efficient and cost effective method for producing a phased array Doppler sonar transducer.

In one preferred embodiment of the invention, a single piece of piezoelectric material is bonded by a conductive adhesive to a copper clad circuit board. A diamond wheel is then used to cut through the material, the adhesive and the copper layer on the circuit board. The resulting transducer has generally rectangular planar staves held in a parallel side-by-side relation. The cutting allows the acoustic centers of the staves to be precisely spaced apart at a distance of approximately one-half of a wavelength of the operating frequency.

In accordance with another aspect of the invention, electrical connections are made to the opposite side edges of each of the staves through leads and bus wires. The proper polarity of the staves is achieved by this wiring. The array of staves defines an active planar acoustic face for simultaneously sending and for receiving a pair of angularly separated beams of acoustic energy without electronically phasing or time delaying the signals transmitted to and from the individual staves and without mechanically rotating the array.

DESCRIPTION OF THE PREFERRED EMBODIMENT

Figure 1B:
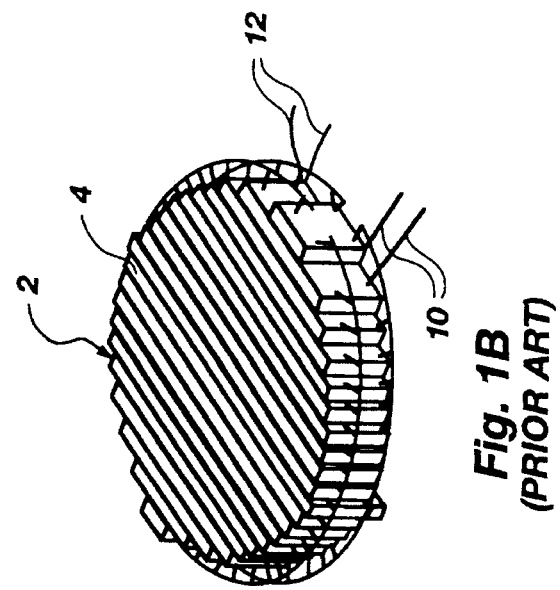
FIG. 1B is a perspective view of the assembled laminate construction of the prior art sonar transducer illustrating the wiring utilized to connect the ceramic strips.
Figure 1A:
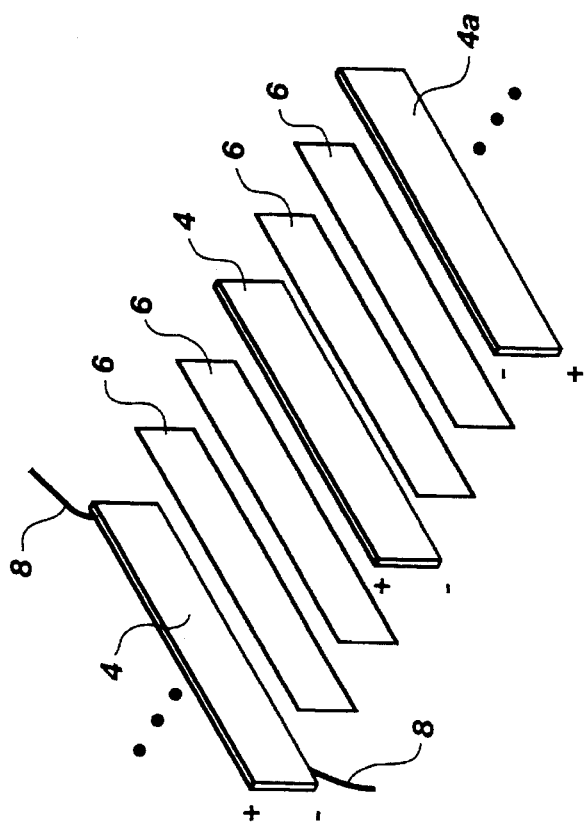
FIG. 1A is an exploded, perspective view illustrating the laminate construction of the sonar transducer of the prior art which includes ceramic strips separated by insulative spacers.

Referring to FIGS. 1A and 1B, there is shown the construction of the prior art piezoelectric assembly, generally indicated at 2. A plurality of staves in the form of thin, rectangular ceramic strips 4 are each separated by a pair of insulating spacer elements in the form of thin, rectangular MYLAR sheets 6. As is known in the art, the proper operation of the piezoelectric assembly 2 depends upon the ceramic strips 4 being mechanically decoupled from one another. While each of the ceramic strips 4 must be mechanically decoupled from one another, the spacing between the ceramic strips 4 must also be carefully regulated. In the prior art, carefully controlling the spacing has been a difficult and expensive process. The ceramic strips are polarized across their widths as indicated by the plus and minus signs in FIG. 1A. The right-most ceramic strip 4a is shown inverted with respect to the left pair of ceramic strips 4. In other words, the positive longitudinal side edge of the right-most ceramic strip 4a is facing downwardly (in relation to the orientation shown in FIG. 1A) whereas the positive longitudinal side edges of the left two ceramic strips in FIG. 1A are facing upwardly. The top and bottom longitudinal side edges of each of the ceramic strips 4 are preferably coated with a layer of silver so that individual wire leads 8 (FIG. 1A) may be soldered thereto. The silver is bonded to the piezoelectric ceramic strips forming what is hereafter referred to as the "top" and "bottom" electrodes in reference to the longitudinal side edges.

The lengths of the ceramic strips are progressively dimensioned so that when the ceramic strips 4 and MYLAR spacers 6 shown in FIG. 1A are sandwiched together as illustrated in FIG. 1B, they form a generally cylindrical flat disk which provides the desired acoustic characteristics and which can fit into a cylindrical cavity of a housings. FIG. 1B also partially illustrates the electrical connections made between the ceramic strips 4 and the electrical components which drive the ceramic strips 4. A pair of wires 10 which are connected to the "even" ceramic strips 4 and referred to as an "even bus" and a pair of wires 12 which are connected to the "odd" ceramic strips 4 and referred to as an "odd bus" are both represented in FIG. 1B. The assembled ceramic strips 4 are generally referred to in the art as "staves."

In the prior art, once the assembly 2 of piezoelectric ceramic strips 4 represented in FIG. 1B is formed, the rearward face of the assembly 2 is soldered to a wire mesh used to connect all the "bottom" electrodes. Disadvantageously, the fabrication of the assembly 2 represented in FIG. 1B is a labor intensive procedure which requires each of the staves 4 and spacers 6 to be individually placed by hand. Then, each of the staves 4 must be individually connected to the even and odd busses, 10 and 12, respectively.

In contrast to the method and structures of the prior art, the embodiments of the present invention provide that an assembly of staves can be fabricated without requiring the labor intensity of the prior art. Moreover, the embodiments of the present invention provide an assembly of staves which are more accurately spaced apart and more accurately constructed than with prior art methods.

Figure 2A:
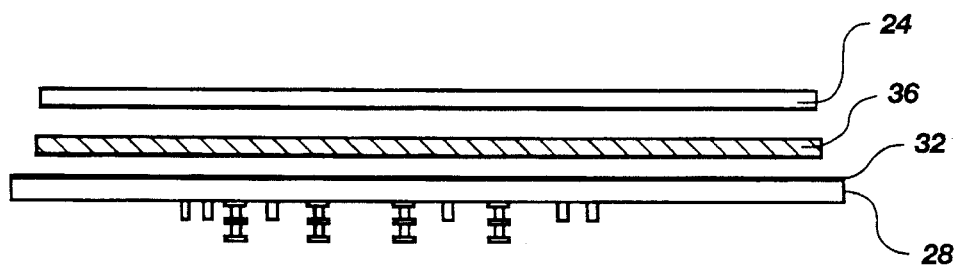
FIG. 2A is an exploded, perspective view illustrating the laminate construction of a preferred embodiment of the transducer of the present invention which includes a ceramic disk, conductive adhesive and a copper cladded circuit board.
Figure 2B:
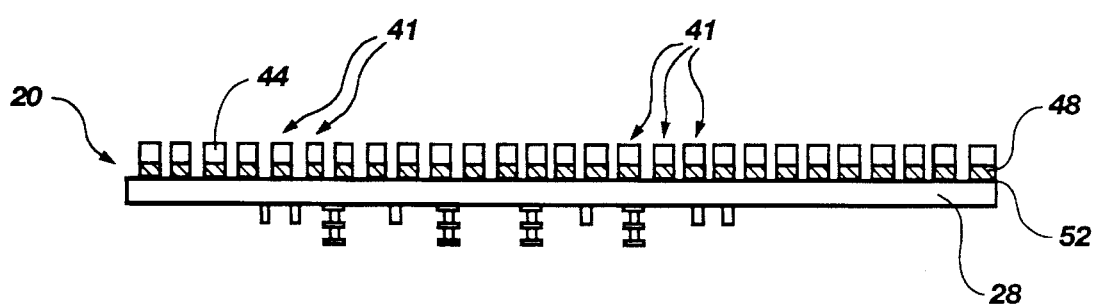
FIG. 2B is a side view of the assembled laminate construction of a preferred embodiment of the sonar transducer of the present invention.

In accordance with the present invention, reference will now be made to FIG. 2A which is an exploded, side view illustrating the laminate construction of the preferred embodiment of a preferred transducer assembly, generally designated at 20 in FIG. 2B. FIGS. 2A and 2B will be used to explain the fabrication of the transducer 20. The protrusions represented on the lower side of the transducer 20 represent appropriate electrical and physical connection points as will be understood by those skilled in the art.

The preferred embodiment of the transducer 20 includes a generally cylindrical disk 24 comprising a piezoelectric material, a magnetostrictive material, or some other transducer material, as is now known, or may become available, in the art, electroded on both faces and poled between. Preferably, silver is bonded to the faces to facilitate an electrical connection, and are referred to as the "top" and "bottom" electrodes. It will be appreciated that the disk 24 can also be fabricated into other shapes as the application may require. Also included in the preferred embodiment of the transducer 20 is a circuit board 28 which is clad with a layer of copper 32 or some other appropriate conductive material. The disk 24 is preferably affixed to the copper cladded circuit board 28 by a conductive epoxy 36 such as is known in the art. Alternatively, other methods of affixing the disk 24 to the copper circuit board 28 can be Used as well as techniques which allow the transducer material to be directly formed on a substrate may also be utilized.

Referring to FIG. 2B, the preferred method of the present invention provides that once the disk 24 is affixed to the circuit board 28 a plurality of individual staves are formed. A plurality of cuts are formed in the compiled disk 24 and the circuit board 28 such that the resulting structure illustrated in FIG. 2B. is produced. The cuts can be made using any number of available techniques. It is preferred that the cuts be made by a diamond wheel with accompanying control systems, as is known in the art.

The cutting device is passed over the disk 20 to cut the disk into a plurality of staves, some being generally referenced at 41 in FIG. 2B. It is preferred that forty-four staves are formed from the disk 24. As will be appreciated by those skilled in the art, the number of staves 41 can be adjusted in accordance with the particular application for the transducer, but should be a multiple of four. As can be seen from FIG. 2B, the cuts pass through the piezoelectric (or ferroelectric) material 44, the conductive epoxy 36 and the copper layer 32 on the circuit board 28 so that the staves 41 are electrically and mechanically isolated from each other. At their bases, they are joined electrically and mechanically to the circuit board 28 which acts as a substrate.

As represented in FIG. 2B, each of the completed staves 41 includes a rectangular cross sectional shaped strip 44 made of piezoelectrode ceramic material with a top electrode and a bottom electrode, a strip of conductive epoxy 48 and a strip of conductive copper 52. As mentioned earlier, affixing the disk 24 (FIG. 2A) to the circuit board 28 prior to cutting advantageously allows the staves 41 to be spaced apart precisely during the cutting procedure. In contrast to the method and structure of the prior art, the staves 41 advantageously need not be hand placed or separated by Mylar as the cutting device can be adjusted to leave the proper spacing between each pair of staves.

Figure 3:
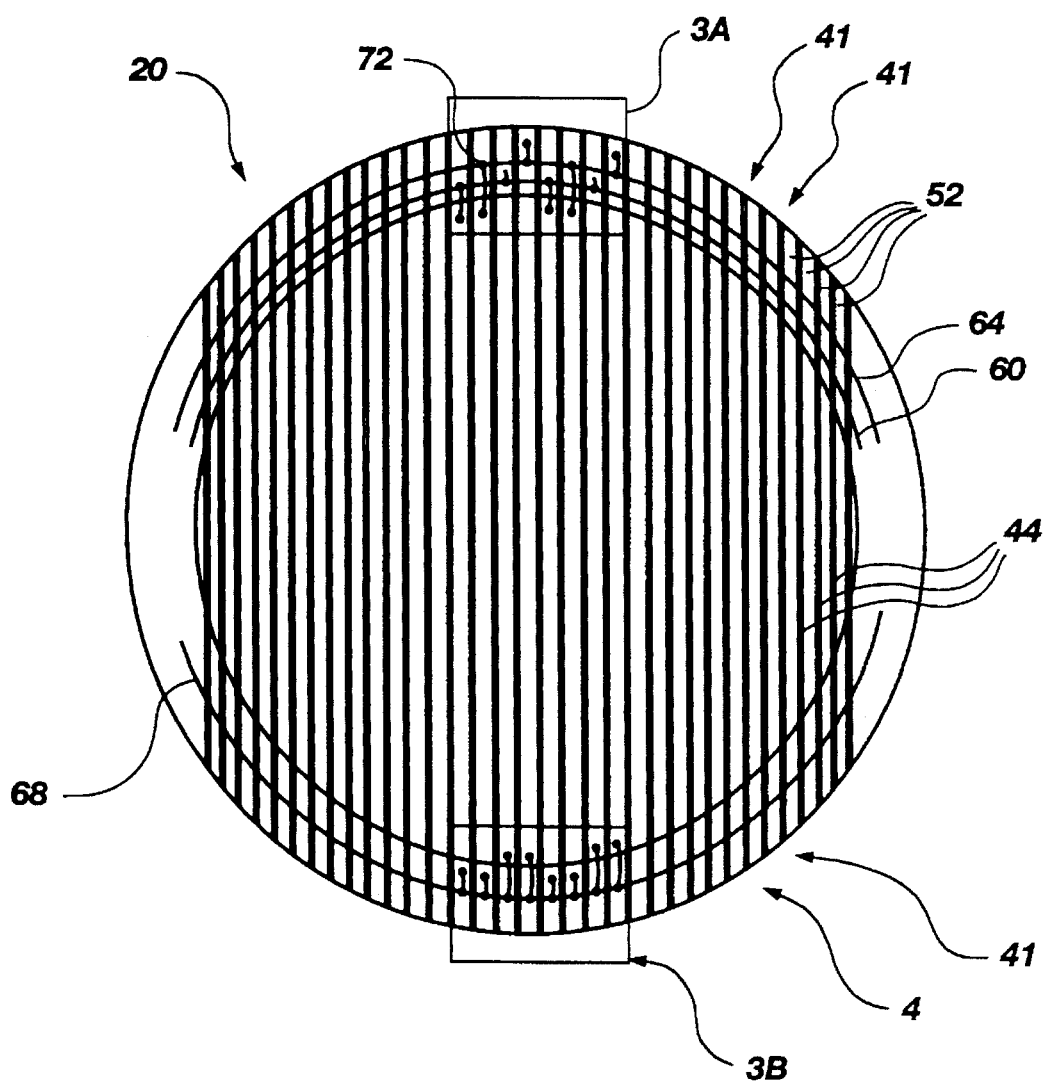
FIG. 3 is a top view of the staves of the transducer in conductive connection with the buss wires.
Figure 3A:
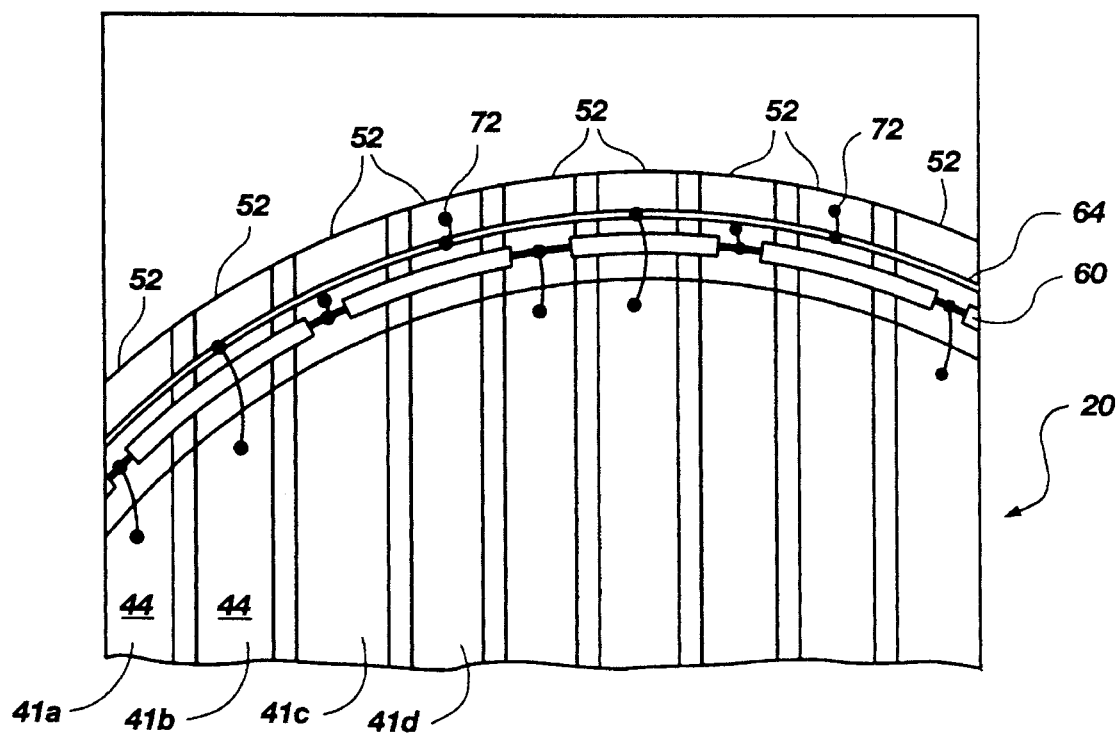
FIGS. 3A and 3B are top, close-up views of the wiring shown in FIG. 3.
Figure 3B:
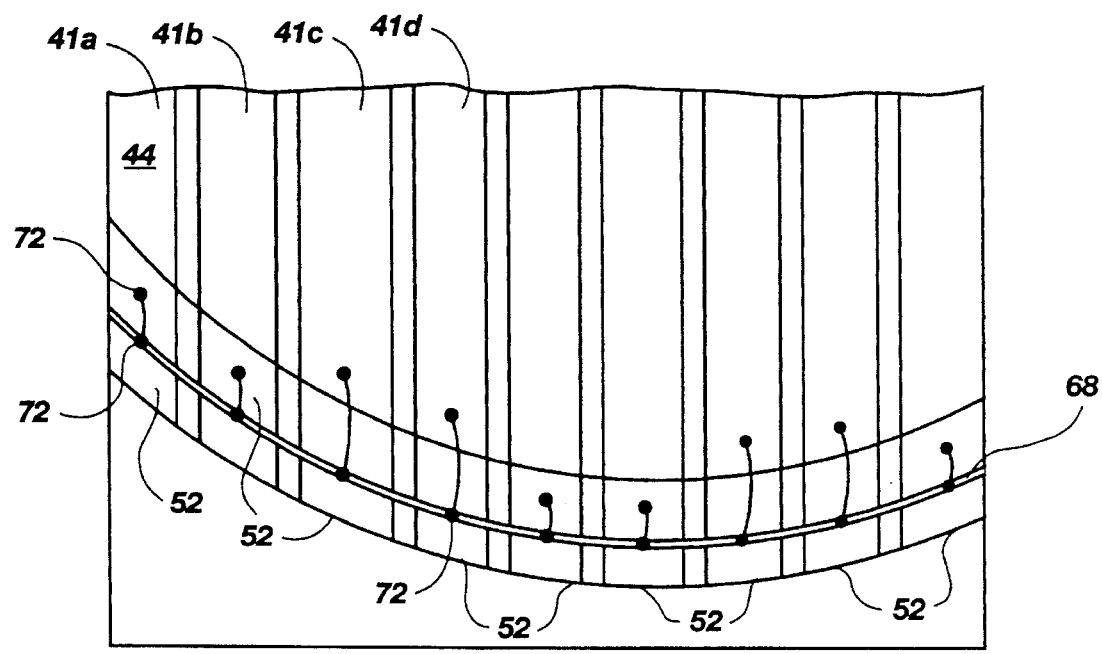

Reference will now be made to FIGS. 3, 3a and 3b for a further explanation of the structure of the transducer and the electrical connections thereto. FIG. 3 is a top view of the staves 41 of the transducer 20 with a general representation of the electrical connections made thereto. FIGS. 3 and 3B are detail top views of the staves 41a, 41b, 41c, 41d, and so forth, taken from windows 3A and 3B in FIG. 3, and show the wiring for forming the staves into an acoustic phased array transducer 20.

As shown best in FIGS. 3a and 3b, an even buss 60 and an odd buss 64 are positioned adjacent to one end of the staves 41a, 41b, 41c, and 41d, and a common buss 68 is disposed adjacent to the opposite end of the staves 41a, 41b, 41c, 41d. The staves 41a, 41b, 41c, and 41d are each connected to the common buss 68 and one of the even or odd buss, 60 or 64, respectively. A solder connection (all of which are referenced in the figures at 72) is made between the common buss 68 and the top electrode of the strip 44 or metallic layer (or strip) 52 depending on the position of the stave. At the opposite end, the staves 41a, 41b, 41c, or 41d are connected to the even buss 60 or to the odd buss 64 depending on the position of the stave. The connection is made by a solder attachment 72 to either the top electrode of strip 44a–d or the metallic layer 52, depending on the position of the stave. Alternately, a "flex circuit" to be discussed in FIG. 6 can be configured to create the proper wiring and soldered to the ceramic and metallic layer.

Figure 4A:
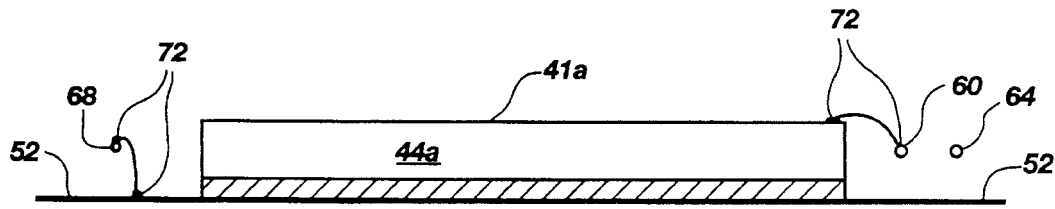
FIGS. 4A–D are side views of the staves in sequence according to the wiring shown in FIG. 3.

Reference will next be made to FIGS. 4A–D which are side views of the staves 41a, 41b, 41c, and 41d, respectively, in sequence according to the wiring illustrated in FIGS. 3, 3a, and 3B. As represented in FIG. 4A, the stave 41a is connected to the common buss 68 by a solder attachment 72 to the metallic layer 52. At the opposing end, the stave 41a is attached by another solder attachment 72 between the even buss 60 and the top electrode of piezoelectric ceramic strip 44a.

Figure 4B:
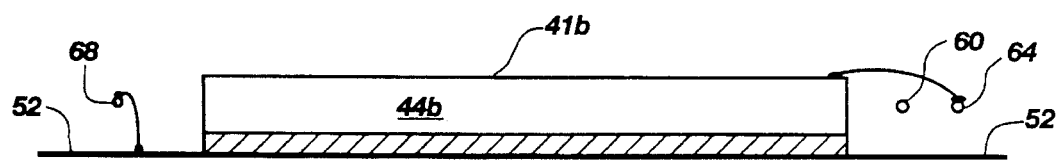
Figure 4C:
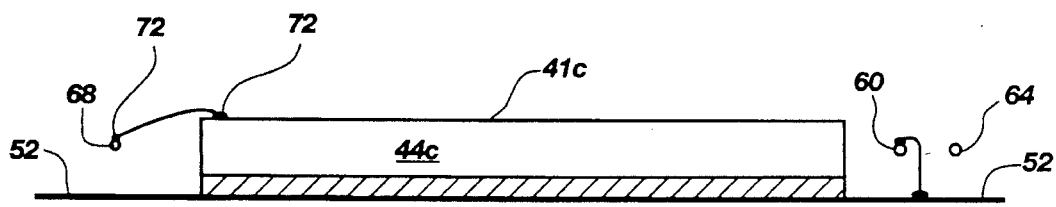
Figure 4D:
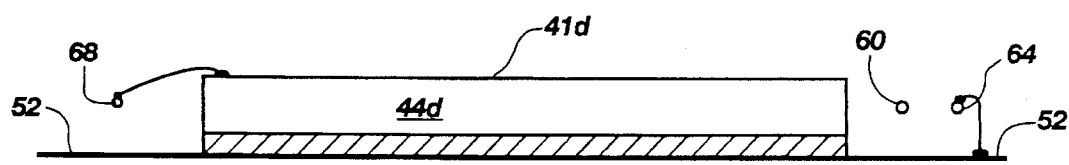

Positioned adjacent to the stave 41a is the stave 41b which is represented in the side view of FIG. 4B. As shown in FIG. 4B, the metallic layer 52 is connected to the common buss 68 and the strip 44b is connected to the odd buss 64. Continuing the pattern, the stave 41c is positioned next to stave 41b. As illustrated in FIG. 4C, in the case of the stave 41c, the common buss 68 is connected to the strip 44c and the even buss 60 is connected to the metallic layer 52. As illustrated in FIG. 4D, the strip 44d of stave 41d is connected to the common buss 68 while the metallic layer 52 is connected to the odd buss 64. The attachments between the staves 41a, 41b, 41c, and 41d and busses 60, 64 and 68, respectively, repeat in the same order to form the connection pattern shown in the schematic FIG. 5.

Figure 5:
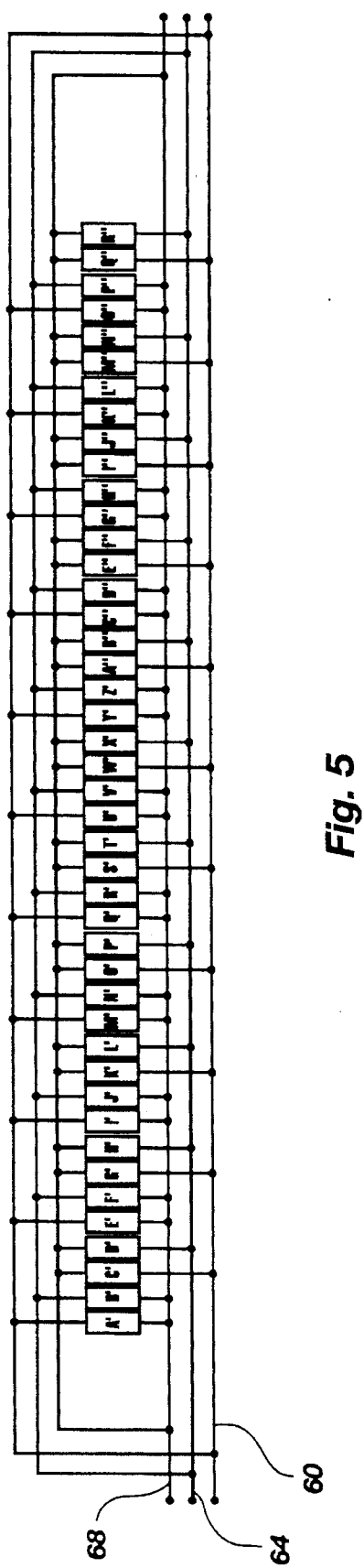
FIG. 5 is a schematic illustration of the wiring of the staves of the preferred embodiment of the invention.

FIG. 5 is a schematic illustration of the wiring of the staves of a preferred embodiment of the invention. In FIG. 5 the common bus 68, the even bus 60, and the odd bus 64 are represented. This wiring scheme creates the needed polarity pattern. The blocks representing the staves are sequentially designated beginning at A' and continuing to R".

Figure 6:
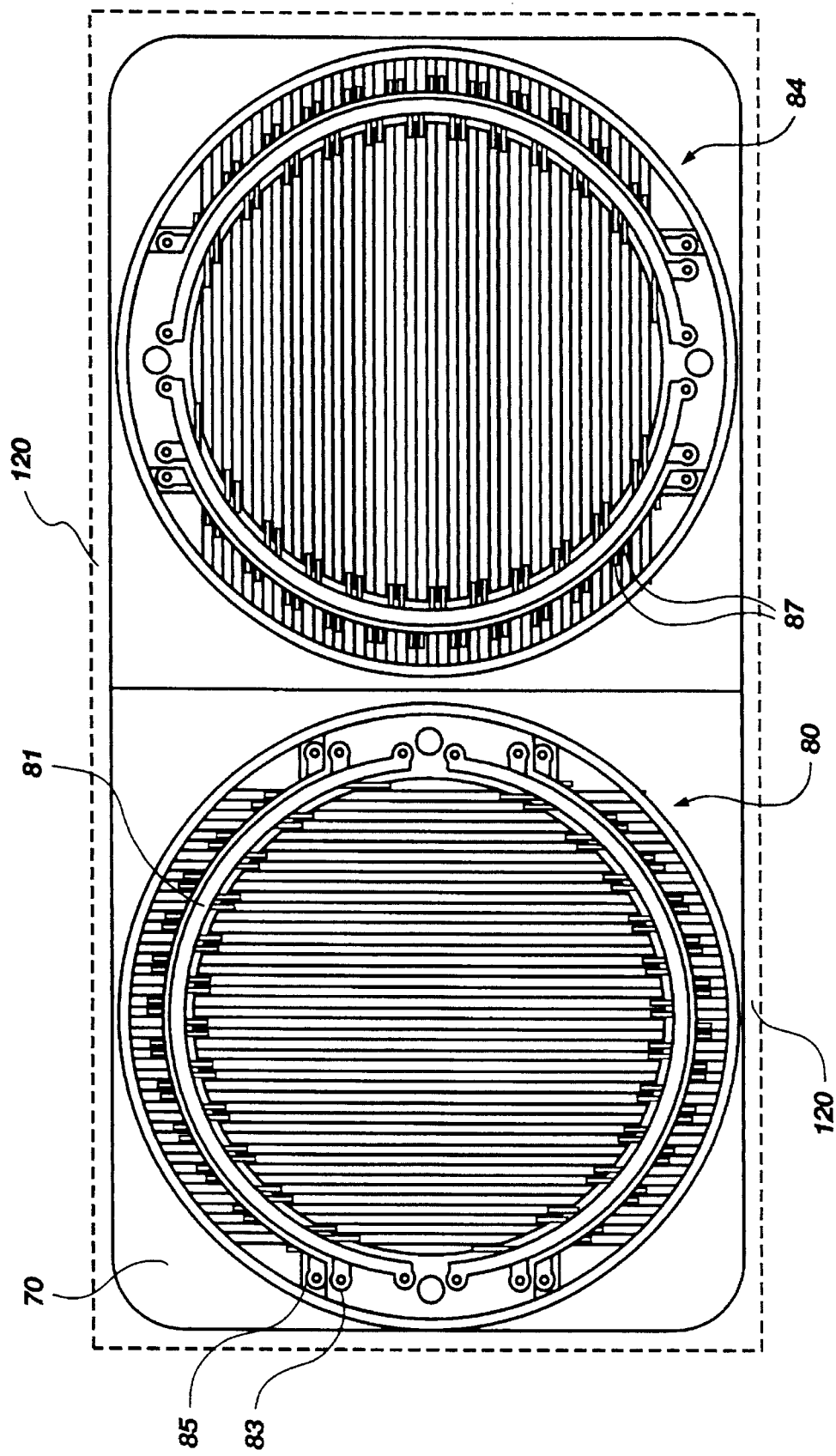
FIG. 6 shows the faces of two phased array acoustic transducers in accordance with the present invention mounted in a housing for attachment to the bottom of a vessel.

The electrical connection pattern represented in FIGS. 3, 3A–B, 4A–D, and 5 provides several benefits. As represented in FIG. 6, preformed rings 81, 83, and 85 known as flex circuits can be provided which accommodate connection points with all of the electrical attachments between the busses and the staves ready to be made thus obviating the need to make hand wired connections at every attachment between the busses and the staves.

Referring now to FIG. 6, a bottom view of a housing 70 is provided having two planar phased array transducers, generally designated at 80 and 84 in FIG. 6, and made in accordance with the above-provided description. As indicated earlier, rings 81, 83, and 85 can be provided which accommodate connection points. The connection points can be fabricated into the rings using techniques known in the art. For example, the connection points represented on ring 81 are formed as integral tabs on the ring 81. The tabs, two of which are represented at 87, are formed to be directly in position for connection to the proper stave. As will be appreciated from an examination of the figures, the ring 81 can function, for example, as the common bus, the ring 83 can function, for example, as the even buss, and the ring 85 can function, for example, as the odd buss.

As known in the art, the housing 70 holding the two planar phased array transducers is mounted on the bottom of a vessel (not shown in the FIG. 6) so that the phased array transducers 80 and 84, shown in FIG. 6, are aimed downward toward the bottom of the body of water. In order to protect the phased arrays 80 and 84, an acoustically appropriate material can be placed over the exposed face of the array to form a window 120, shown in phantom line in FIG. 6, and to prevent any damage which may be caused by water or other foreign objects.

Figure 7:
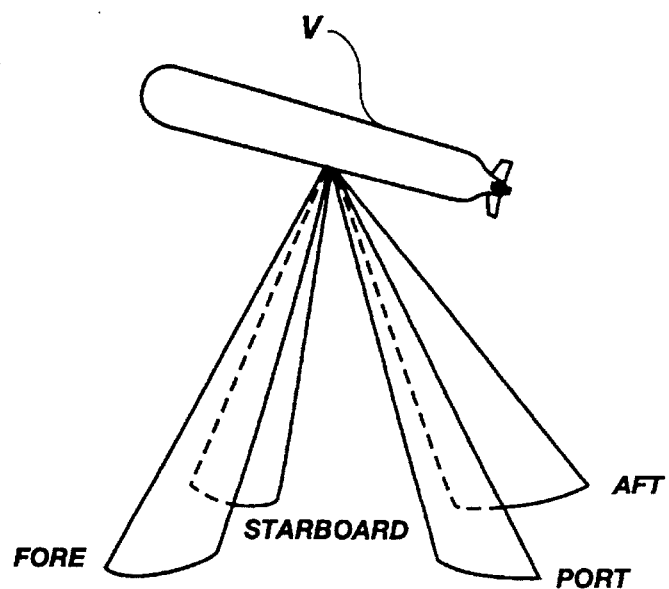
FIG. 7 is a perspective view of an underwater autonomous vehicle with the sonar beams produced by the Janus configuration being represented.

As represented in FIG. 7, one transducer array 80 forms a pair of beams along the fore/aft axis of a vessel V while the other transducer array 84 forms a pair of beams along the port/starboard axis of the vessel V. The four beams are arranged in Janus configuration, as known in the art, each beam preferably having a depression angle of about sixty degrees.

The above-described phased array transducer 20 provides accurate measurements of the two way Doppler shift. As will be appreciated by those skilled in the art, as the vessel V moves through the water a Doppler shift in the acoustic wave occurs. A Doppler shift occurs in both the incident, or transmitted, acoustic wave and in the reflected, or return, acoustic wave. These two Doppler shifts are not equal. For example, if a vehicle is traveling at a velocity, v, the acoustic signal received by the bottom will have a frequency of $$f_b = \frac{f_o}{1 - \frac{v}{c} \cos(A)} \qquad \text{Equation (1)}$$

$f_o$=transmitted frequency from vehicle
v=vehicle speed
c=speed of sound
A=depression angle from the horizontal This acoustic signal is reflected by distributed scatterers on the bottom of the body of water back to the vessel and experiences a second Doppler shift, which results in a received frequency at the transducer of $$f_r = \frac{f_o(1 + v\cos(A)/c)}{1 - v\cos(A)/c} \qquad \text{Equation (2)}$$

The Δ Doppler frequency is the difference between the frequency transmitted from the transducer and the frequency received back at the transducer. The Δ frequency for one beam is then $$lf_d = f_r - f_o = \frac{2f_o \frac{v}{c} \cos(A)}{1 - \frac{v}{c} \cos(A)} \qquad \text{Equation (3)}$$

It will be appreciated that the denominator of Equation (3) is near unity for small velocities. Therefore, Equation (3) can be simplified as shown in Equation (4).

$$f_d \approx 2f_o \frac{v}{c} \cos(A) \qquad \text{Equation (4)}$$

As the velocity of the vessel approaches ten knots, the one beam error using Equation (4) approaches 0.2%. As will be appreciated by those skilled in the art, the Janus configuration contributes to the reduction of the error which is experienced. If the total Δ frequency of two opposing Janus beams is defined as set forth in Equation (5).

$$\Delta f = (f_{d_{fore}} - f_{d_{aft}})/2 \qquad \text{Equation (5)}$$

then $$\Delta f = \frac{2f_o \frac{v}{c} \cos(A)}{1 - \frac{v^2}{c^2} \cos^2(A)} \qquad \text{Equation (6)}$$

The second term in the denominator of Equation (6) is negligible and the resulting Δ frequency becomes $$\Delta f = 2v \frac{f_o}{c} \cos(A) \qquad \text{Equation (7)}$$

With a depression angle of 60 degrees, the velocity is simply expressed as set forth in Equation (8)

$$v = \Delta f \lambda \qquad \text{Equation (8)}$$

The phased array transducers 80 and 84 of the present invention offer a number of significant operational advantages. Among the most important features is the capability of each phase array transducer 80 and 84 to compensate for variations of speed of sound. Since both acoustic beams on an axis (e.g., the fore/aft axis or the port/starboard axis) are produced by the same phased array 80 or 84 of the transducer 20, they are inseparably linked, having the same frequency, phase, amplitude, shape, and beam depression angle. The two acoustic beams main response axes must also lie in a single plane normal to the face of the array. It is by virtue of this beam symmetry that the self compensating characteristic of the phased array transducer is realized.

Figure 8A:
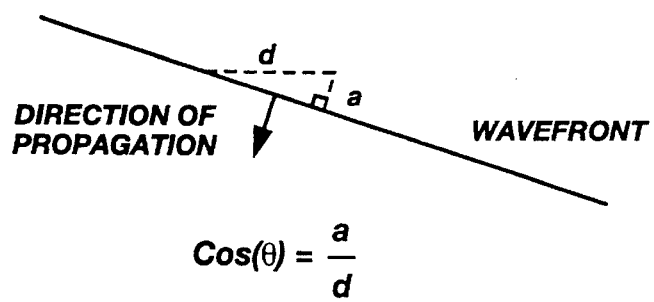
FIG. 8A is a diagram showing some of the acoustic properties of a phased array transducer of the present invention.

Reference will next be made to FIG. 8A to provide a further explanation of the self compensating characteristic of the phased array transducer. As shown FIG. 8A, the cosine of the beam depression angle is equal to the phase delay, a, divided by the phase center spacing, d. The depression angle is provided by Equation (9).

$$\cos(\theta) = \frac{a}{d} \qquad \text{Equation 9}$$

Two variables representing the speed of sound can be defined. The actual speed of sound in the water will be represented by c, while the value assumed for array design purposes will be referred to as $c_o$. Also, the frequency of operation specified in the design of the system is represented by $f_o$. The phased array transducer of the present invention is preferably designed so that when transmitting the distance between phase centers d is equal to one wavelength or λ.

$$d = \lambda_o = \frac{c_o}{f_o} \qquad \text{Equation 10}$$

The length of the line segment a in FIG. 8A where wavefront addition will occur is given by Equation (11).

$$a = \frac{\lambda}{2} = \frac{c}{2f_o} \qquad \text{Equation 11}$$

Substituting Equations (10) and (11) into Equation (9) gives $$\cos(\theta) = \frac{\frac{c}{2f_o}}{\frac{c_o}{f_o}} = \frac{c}{2c_o} \qquad \text{Equation 12}$$

Substituting Equation (12) into Equation (7) yields $$\Delta f = 2v \frac{f_o}{c} \cdot \frac{c}{2c_o} \text{ or } v = \Delta f \lambda_o \qquad \text{Equation 13}$$

As indicated by equation (13), a velocity calculation made with the phased array transducer of the present invention is not dependent on the actual speed of sound in the medium. Accurate vessel velocities can therefore be determined without the need for speed of sound measurement equipment as is the case with some prior art devices.

Figure 7A:
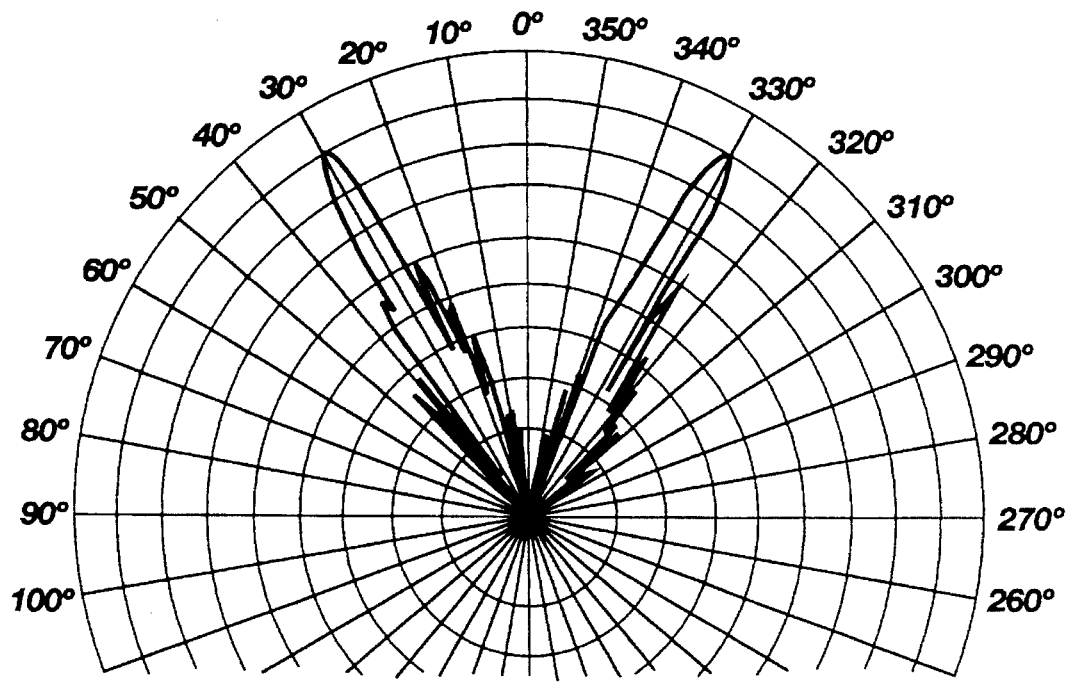
FIG. 7A is a diagram showing the transmit radiation pattern of a phased array transducer of the present invention.
Figure 7B:
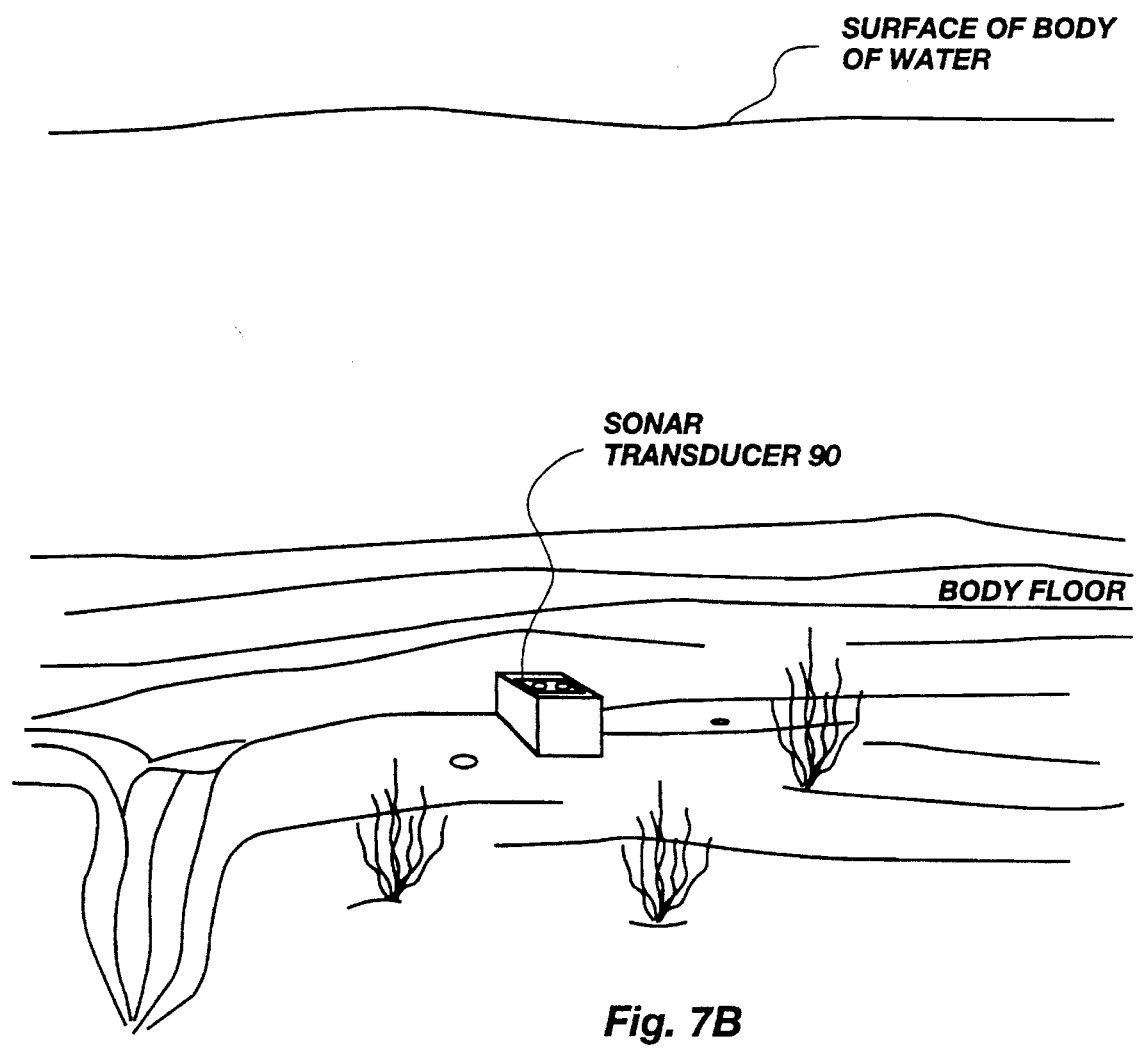
FIG. 7B is a different perspective view showing an underwater stationary sonar station for water current profiling.

FIG. 7B is an illustration of the present invention used as a water current profiling sonar. When the transducer is mounted to track vessel movement relative to the ocean floor, it is aimed to reflect off distributed scatterers on the floor. However, distributed scatterers are anything in the water capable of reflecting acoustic signals of the transducer. Therefore, the scatterers can be objects such as air bubbles in the water itself. As shown, the transducer 90 is placed on the ocean floor and aimed straight up toward the water surface so as not to receive reflections from the ocean floor. However, this configuration should not be perceived as limiting. For example, a second transducer mounted on a vessel such that it does not receive reflected signals from the ocean floor will also enable current profiling of water relative to the vessel.

Figure 8B:
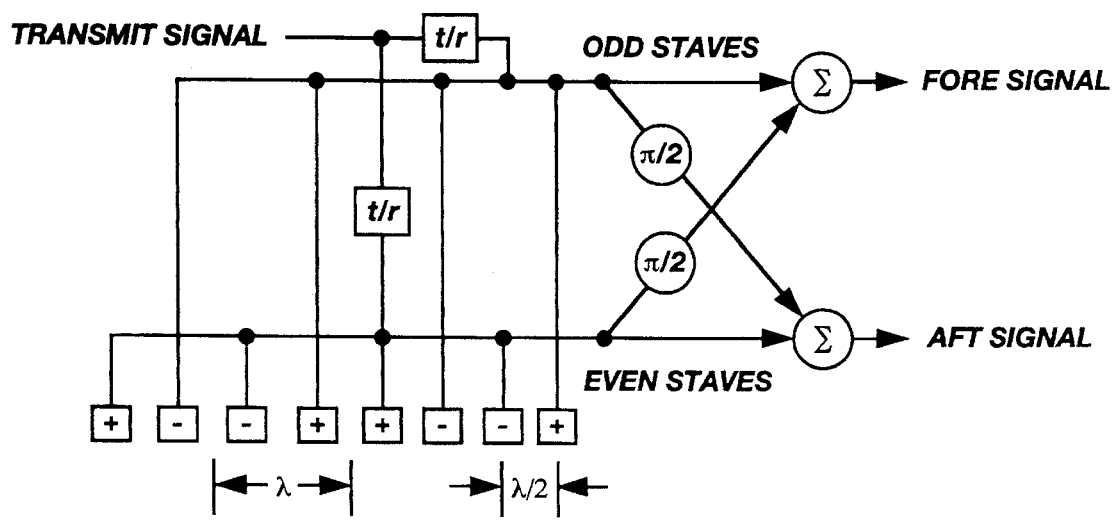
FIG. 8B is a diagrammatic acoustic representation of the preferred phased array transducer of the present invention.

FIG. 8B is a simplified diagrammatic representation of the preferred phased array transducer of the present invention and illustrates how the phased array generates the acoustic beams necessary for Doppler operation. It can bee seen in FIG. 8B that the individual elements or staves of the array are arranged in a polarity sequence of + + − − + +. The elements or staves are also ordered in two electrically connected groups designated "even" and "odd" corresponding to those connected to the even bus and those connected to the odd bus, respectively, as discussed earlier. Accordingly, selected pairs of adjacent staves develop like charges, and are interspersed with oppositely charged pairs of adjacent staves. When the phased array is transmitting, in-phase signals are applied to both the even and odd staves. Adjacent + + or − − elements act as one source with a phase center located halfway between them. The phased array then acts as a line array with one wavelength spacing. Adjacent phase center groups produce signals shifted by $\lambda/2$. The acoustic energy forms into beams in front of the array, forming two beams oppositely directed with a 60° depression angle. The resulting radiation pattern of the preferred array is shown in FIG. 7A.

When the phased array transducer is operating in the receive mode, the even and odd staves operate independently from one another. The phased array then functions as a line array with phase centers spaced at $\lambda/2$. The acoustic wavefront which has been reflected from the bottom of the body of water and returning to the transducer, arrives at the same approach angle as the transmitted beam, induces signals in the even and odd staves that are out of phase with one another by 90°. A phase selective combining network uses the resulting 90° phase shift to separate the two acoustic beams into fore and aft signals.

The phased array transducer of the present invention offers an additional advantage over the prior art in that the transducer's face (phased arrays 80 and 84 in FIG. 6) is completely flat. This allows the water to flow by the transducer with minimal turbulence, and allows for simplified installation and alignment. Another advantage, which is not generally recognized in the art, stems from the fact that since each array (80 and 84 in FIG. 6) produces two sonar beams (fore/aft or port/starboard as represented in FIG. 7) compared to conventional Doppler sonar schemes that use separate transducers for each beam, the present invention can be readily fabricated to be smaller and lighter than previously available devices.

Prior to the advent of the present invention, phased array transducers were unduly complex and expensive. However, as was discussed above, the phased array transducer of the present invention overcomes these drawbacks while providing improved performance.

Figure 9:
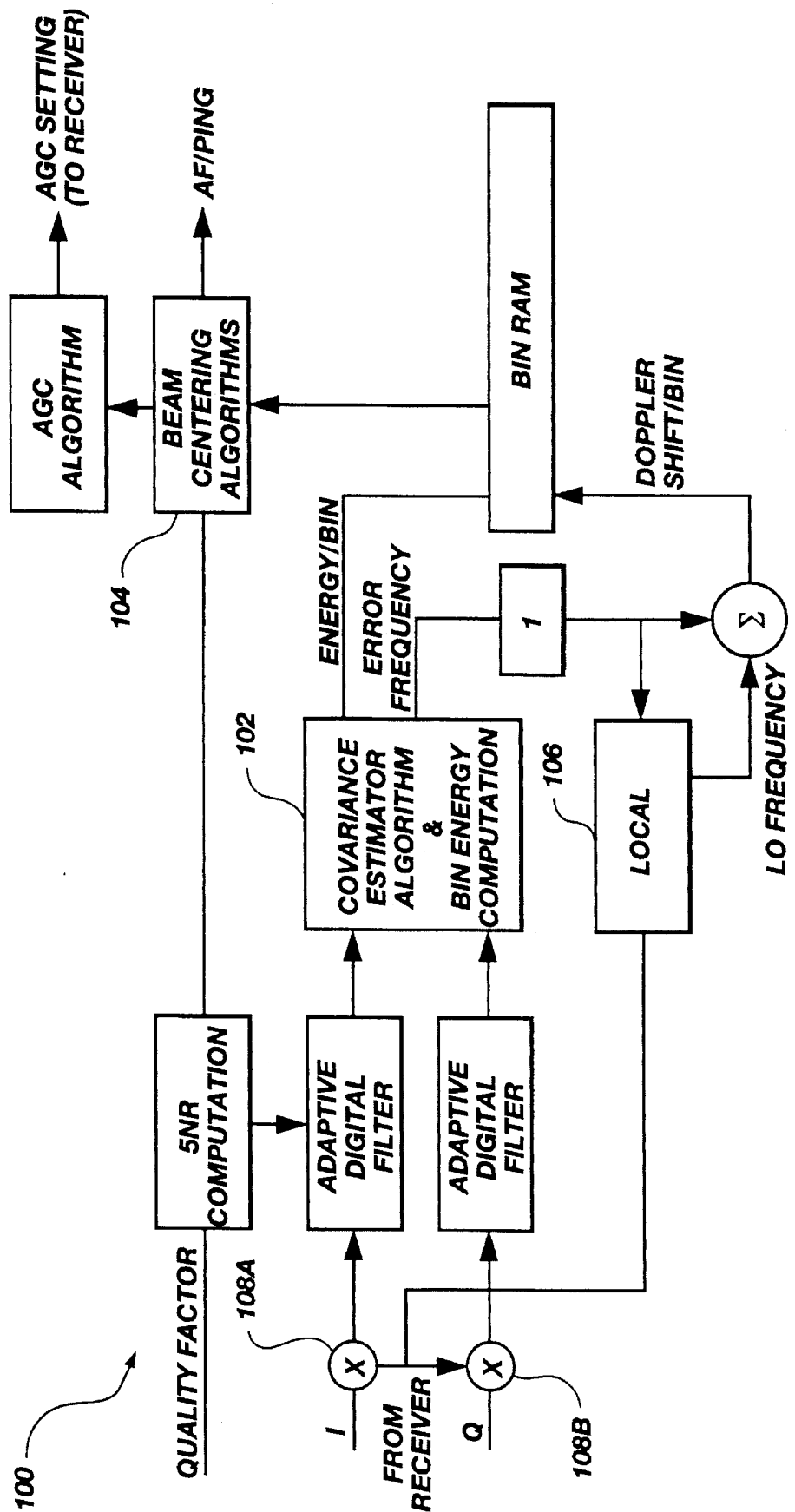
FIG. 9 is a simplified block diagram of a portion of the electronics used in a preferred embodiment of the present invention.

In accordance with another aspect of the invention, FIG. 9 provides a high level block diagram of a frequency discriminator and control loops, generally designated at 100, used for bottom track and which are particularly advantageously used with the phased array transducer of the present invention described above. It will be appreciated that while FIG. 9 is described as a "block diagram," many (or all) of the functions represented therein can be carried out by discrete components or by digital processors which are now known in the art or which may become available in the future. Thus, the blocks represented in FIG. 9 are represented as functions which are carried out, including algorithms, using any of the many available components. Moreover, those skilled in the art will readily be able to construct a complete sonar velocity measurement system, including all necessary electrical components such as display devices, using the information contained herein and in the publication Urick, R. J., *PRINCIPALS OF UNDERWATER SOUND* (1983) which is now incorporated herein by reference.

A primary component of a Doppler sonar system is a frequency discriminator. In one preferred implementation of a frequency discriminator, a discrete covariance estimator algorithm 102 is used. The preferred algorithm is a maximum likelihood estimator and is based on the Fourier pair relationship between a signals power spectrum and its corresponding auto-covariance function. Further information on the described maximum likelihood estimator algorithm can be obtained from Miller, K. S., and Rochwarger, M. M., "A Covariance Approach to Spectral Moment Estimation" IT–18 *IEEE Trans. on Information Theory* No. 5, pp. 588–596 (September 1972).

In the presently preferred implementation, eight independent frequency discriminators and control loops are used: four bottom track estimators and four water profile estimators. The water profile control loop is similar to the arrangement illustrated in FIG. 9 except that the beam centering algorithms 104 are replaced with bin summation routines.

The discrete covariance estimator algorithm 102 is used in conjunction with channel independent digital local oscillators 106 to estimate and track the Doppler frequency shift. The digital local oscillator 106 continually down converts the signal to base band using the previous estimate of the Doppler frequency. Finite impulse response (FIR) filters are used as adaptive digital filters 110A&B because they are very stable and accurate thus providing excellent channel match between beams. The arrangement illustrated in FIG. 9 is desirably not substantially influenced by temperature drift or bias since the local oscillator and filters are digital rather than analog.

Another advantage of the implementation of the present invention represented in FIG. 9 is the elimination of tracker lag found in prior art frequency discriminators. Prior art frequency tracker designs simply reported the output of their control loop which could have a time constant up to several seconds. This lag had an adverse effect on navigation systems since any acceleration of the vehicle would require an equal deceleration to compensate, or a small bias would result. The implementation of the present invention represented in FIG. 9 reports the sum of the tracking local oscillator plus the error frequency. Therefore, the only integration in the reported velocity is due to the integration time over the length of one transmit pulse.

Because the digital local oscillators track the frequency shift, the use of adaptive digital filters 110A&B centered around the local oscillator frequencies is particularly advantageous. In prior art schemes, components needed to accommodate a bandwidth as wide as the total possible Doppler shift due to the maximum velocity of the vehicle. The preferred adaptive digital filters 110A&B can have significantly narrower bandwidths since the adaptive digital filters 110A&B only need to be as wide as the transmitted spectrum plus the expected frequency deviation from the previous echo. The bandwidth of the adaptive digital filters 110A&B is preferably automatically set via control circuitry (not explicitly represented in FIG. 9 and as known in the art) to maintain an optimal signal to noise ratio over varying signal strengths and ranges. The preferred arrangement illustrated in FIG. 9 significantly increases the maximum range (depth) from which measurements can be obtained and the maximum velocities of the vessel which can be measured when compared to previously available schemes.

In the manner described, an efficient and economical sliced phased array doppler sonar system and method for manufacturing the same is provided. It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. An underwater transducer, comprising:

a plurality of groups of rectangular planar staves made of a piezoelectric material, each stave having opposing faces, a long first side edge and an opposing long second side edge;

means for supplying positive and negative electrical charges to the long first and second side edges of each of the staves such that opposite polarity is developed between said edges, said supplying means including an even buss, an odd buss and a common buss, wherein each group of staves is comprised of four staves each such that:

a first stave first edge is connected to the common buss and second edge is connected to the even buss;

a second stave, adjacent the first stave, has a first edge connected to the common buss and second edge connected to the odd buss;

a third stave, adjacent the second stave, has a first edge connected to the even buss and second edge connected to the common buss; and a fourth stave, adjacent the third stave, has a first edge connected to the odd buss and second edge connected to the common buss, the staves being supplied electrical charges such that selected pairs of adjacent staves develop like charges, and are interspersed with oppositely charged pairs of adjacent staves;

support means for holding the staves by the long first side edges in an array such that the staves are spaced apart one from another so that each stave is electrically isolated from every other stave, with their opposing faces being generally parallel with one another, with exposed long second side edges defining a generally planar active sonar face, the spacing between staves being about one-half wavelength of a predetermined operating signal so that a phase center of the signal is established at approximately a midpoint between like-charged adjacent staves; and means for affixing the staves to said support means.

2. A transducer according to claim 1, wherein the support means includes a circuit board affixed to the long first side edge of said staves.

3. A transducer according to claim 2, wherein the circuit board includes a layer of metal to which the staves are affixed.

4. A transducer according to claim 3, wherein said staves are affixed to the metal layer by a conductive adhesive.

5. A transducer according to claim 3, wherein the staves are affixed to the metal layer by a conductive epoxy adhesive.

6. A transducer according to claim 1, wherein the staves are formed with varying lengths, the staves nearer the center being longer than staves on either end such that the transducer is generally circular.

7. A transducer according to claim 1, wherein the staves have a long second side edge opposite the long first side edge, the transducer further comprising s resilient window covering the long second side edge of the staves forming the active sonar face.

8. A transducer according to claim 1, wherein the staves are made of a lead-zircon-titanate piezoelectric material.

9. A transducer according to claim 1, wherein the staves are disposed so as to leave a void disposed between each stave and the staves which are adjacent to said stave.

\* \* \* \* \*